(12) United States Patent
Kim et al.

(10) Patent No.: US 8,098,722 B2
(45) Date of Patent: Jan. 17, 2012

(54) METHOD AND APPARATUS FOR EQUALIZATION CONTROL

(75) Inventors: Byoung-Hoon Kim, San Diego, CA (US); Durga Prasad Malladi, San Diego, CA (US); Yongbin Wei, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1109 days.

(21) Appl. No.: 11/387,152

(22) Filed: Mar. 22, 2006

(65) Prior Publication Data

US 2006/0222124 A1 Oct. 5, 2006

Related U.S. Application Data

(60) Provisional application No. 60/666,335, filed on Mar. 29, 2005.

(51) Int. Cl.
*H03H 7/30* (2006.01)
(52) U.S. Cl. ........................................ 375/232
(58) Field of Classification Search .......... 375/229, 375/232, 265, 326, 350
See application file for complete search history.

(56) References Cited

U.S. PATENT DOCUMENTS

| | | | |
|---|---|---|---|
| 4,939,576 A * | 7/1990 | Campbell | 348/607 |
| 5,388,124 A | 2/1995 | Laroia et al. | |
| 5,787,118 A | 7/1998 | Ueda | |
| 6,424,678 B1 * | 7/2002 | Doberstein et al. | 375/260 |
| 7,006,565 B1 * | 2/2006 | Endres et al. | 375/233 |
| 7,031,405 B1 * | 4/2006 | Touzni et al. | 375/326 |
| 7,266,146 B2 * | 9/2007 | Pare et al. | 375/232 |
| 7,292,661 B1 * | 11/2007 | Chan et al. | 375/346 |
| 2002/0186762 A1 * | 12/2002 | Xia et al. | 375/232 |
| 2003/0231726 A1 * | 12/2003 | Schuchert et al. | 375/350 |
| 2004/0085917 A1 * | 5/2004 | Fitton et al. | 370/292 |
| 2004/0096014 A1 * | 5/2004 | Hendrix et al. | 375/320 |
| 2005/0175081 A1 * | 8/2005 | Zhidkov | 375/232 |
| 2005/0185743 A1 * | 8/2005 | Li | 375/350 |
| 2005/0289201 A1 * | 12/2005 | Runze | 708/100 |

FOREIGN PATENT DOCUMENTS

| | | |
|---|---|---|
| JP | 618651 | 1/1994 |
| JP | 1065587 | 3/1998 |
| JP | 2000295145 A | 10/2000 |

(Continued)

OTHER PUBLICATIONS

Kohno et al. "Automatic Equalizer Including a Decoder of Error-Correcting Code in Digital Transmission" Communications in the Information Age. Atlanta, Nov. 26-29, 1984, Proceedings of the Global Telecommunications Conference and Exhibition (GLOBECOMM), New York, IEEE, US, vol. 3, Nov. 1984, pp. 1582-1586.

(Continued)

*Primary Examiner* — David C. Payne
*Assistant Examiner* — Leon-Viet Nguyen
(74) *Attorney, Agent, or Firm* — Rupit Patel; Sayed H. Beladi

(57) ABSTRACT

An equalization filter is provided with the ability to softly switch between pure linear equalization and decision feedback equalization. A reliability gain factor and an associated gain factor calculated by a predetermined mapping relation are provided in a decision feedback path and a feedforward path, respectively. Increasing the reliability gain factor increases the significance of the decision feedback filtering. Better performance than pure linear equalization and pure decision feedback equalization can be achieved.

32 Claims, 9 Drawing Sheets

FOREIGN PATENT DOCUMENTS

WO    WO2004010665    1/2004

OTHER PUBLICATIONS

Witsching et al. "Performance versus Effort for Decision Feedback Equalization—An Analysis based on SC/FDE adapted to IEEE 802.11a" Communications, 2004 IEEE International Conference on Paris, France, Jun. 20-24, 2004, Piscataway, NJ, USA, IEEE, Jun. 20, 2004, pp. 3455-3459.

Poakis, John G. "Digital Communications" 1995, McGraw-Hill International Editions, Singapore, pp. 604 and 621.

International Search Report—PCT/US2006/011649, International Authority—European Patent Office—Nov. 13, 2006.

Written Opinion—PCT/US2006/011649, International Search Authority—European Patent Office—Nov. 13, 2006.

International Preliminary Report on Patentability—PCT/US2006/011649, International Bureau of WIPO—Geneva Switzerland—Oct. 3, 2007.

Lee, et al.: "Digital Communication" 1994, Kluwer Academic Publishers, Section 10.1.3 pp. 453-460; XP002403533.

Lee, et al.: "Digital Communication" 1994, Kluwer Academic Publishers, Section 10.2.3 pp. 473-480; XP002403533.

Kohno R "Design of Automatic Equalizer Including a Decoder of Error-Correcting Code," IEEE Transactions on Communication, V33, N10, pp. 1142-1145, Oct. 1985. Fig. 2, lines 28-40 of the left column and lines 8-13 of the right column on p. 1143, lines 13-16 of the left column on p. 1144.

\* cited by examiner

METHOD AND APPARATUS FOR EQUALIZATION CONTROL

CLAIM OF PRIORITY UNDER 35 U.S.C. §119

The present Application for Patent claims priority to Provisional Application No. 60/666,335 entitled "Method and Apparatus for Equalization in Wireless Communications" filed Mar. 29, 2005, and assigned to the assignee hereof and hereby expressly incorporated by reference herein.

BACKGROUND

1. Field

The present invention relates generally to methods and apparatus for wireless communications, and more specifically to methods and apparatus for equalization control.

2. Background

In communications systems with higher data rates, errors in received data may result in retransmission delays that prevent full utilization of the available bandwidth, One way of reducing retransmission delays is to reduce bit error rates (BER) in the received signal.

More particularly, during communication over a wireless channel, the channel behavior changes over time, thereby affecting (e.g., increasing errors in) the signals transmitted over the channel. It is desirable to compensate for such variations in channel characteristics upon receiving the transmitted signals. Channel equalization can be implemented by linear equalization or decision feedback equalization (DFE). Typically, the performance of DFE is better than linear equalization if the feedback sequence is reliable, but it may become worse otherwise. Thus, it is desirable to take decision reliability into consideration in designing the DFE. One method is to update filter design as a function of the DFE reliability. However, currently considered methods of implementing this require intense computational power.

There is therefore a need in the art for simplifying the computational complexity in optimizing equalization filtering.

SUMMARY

One aspect of the invention is a device configured to process a signal comprising symbol sequences transmitted over a channel. The device comprises a first filter having an input receiving the signal and a feedback loop comprising a subtractor, a decision unit, and a second filter. The subtractor is connected to subtract the output of the second filter from the output of the first filter. The decision unit has an input connected to the output of the subtractor and an output connected to the input of the second filter. The second filter has coefficients weighted by a scalar value comprising a measure of decision reliability.

Another aspect of the invention is a device configured to process a signal comprising symbol sequences transmitted over a channel. The device comprises a first filter having an input receiving the signal, a second filter having its input coupled to the output of the first filter, an adder connected to sum the output of the first filter and the output of the second filter, and a decision feedback loop comprising a subtractor, a decision unit, and a third filter having substantially the same filter coefficients as the second filter. The subtractor is connected to subtract the output of the third filter from the output of the adder. The decision unit has an input connected to the output of the subtractor and an output connected to the input of the third filter.

Still another aspect of the invention is a method of processing a received signal comprising soft-switching between linear equalization and decision feedback equalization.

Still another aspect of the invention is a method of processing a received signal. The method comprises receiving a signal, filtering the signal with a first filter, filtering the output of the first filter with a second filter, adding the output of the first filter to the output of the second filter, subtracting a decision feedback signal from the result of adding to provide a signal for decision, constructing an estimate of the result symbol of the step of subtracting such that the estimate is one of a set of predetermined symbols, filtering a sequence of the symbol estimates to provide the decision feedback signal with a third filter having substantially the same filter coefficients as the second filter.

Still another aspect of the invention is a device for processing a received signal. The device comprising means for soft-switching between linear equalization and decision feedback equalization and means for decoding equalized signal.

Still another aspect of the invention is a device configured to process a received signal. The device comprises means for filtering the signal with a first filter, means for filtering the output of the first filter with a second filter, means for adding the output of the first filter to the output of the second filter, means for subtracting a decision feedback signal from the result of adding to provide a signal for constructing, means for constructing an estimate of the result of subtracting such that the estimate is one of a set of predetermined symbols, and means for filtering a sequence of the symbol estimates to provide the decision feedback signal with a third filter having substantially the same filter coefficients as the second filter.

DETAILED DESCRIPTION

The following detailed description is directed to certain specific embodiments of the invention. However, the invention can be embodied in a multitude of different ways as defined and covered by the claims. In this description, reference is made to the drawings wherein like parts are designated with like numerals throughout.

The word "exemplary" is used herein to mean "serving as an example, instance, or illustration." Any embodiment described herein as "exemplary" is not necessarily to be construed as preferred or advantageous over other embodiments.

In one embodiment, a receiver receives signals transmitted over a radio frequency (RF) channel. The receiver comprises a linear equalizer, a decision feedback filter, and a compensation filter concatenated to the linear equalizer, where the feedback filter and the compensation filter have substantially the same filter coefficients. A first multiplicative reliability factor is applied to the output of the feedback filter and a second multiplicative factor related to the first factor through a pre-defined mapping relation is applied to the output of the compensation filter. With this structure, the effect of soft-switching between linear equalization to full decision feedback equalization (DFE) is realized by varying the reliability factor. "Soft-switching" between linear equalization and decision feedback equalization means adjusting the degree to which decision feedback affects the output of the equalization filter. The linear filter may be designed by using known reference data. The feedback filter and the compensation filter coefficients may be determined by using the error sequence between the output from the linear filter and the known reference signal.

Figure 1:
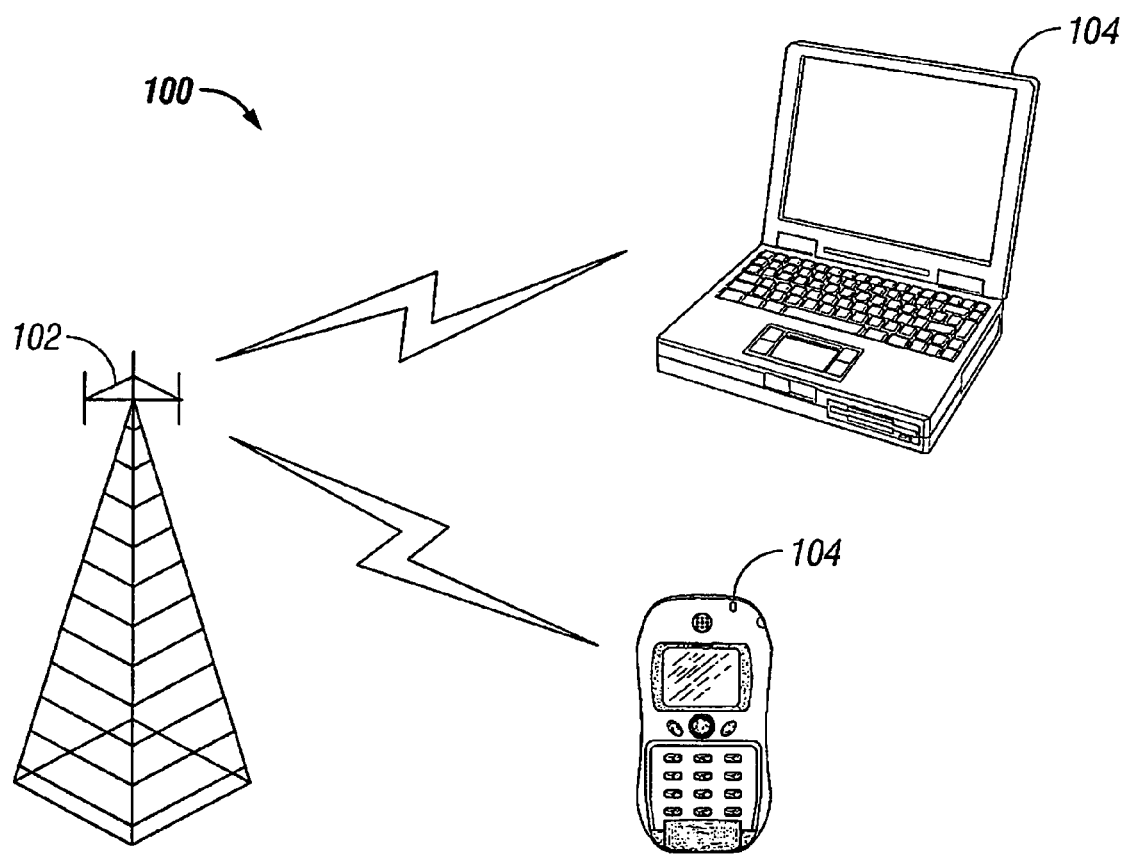
FIG. 1 illustrates an overview of an exemplary wireless communications system 100.

FIG. 1 illustrates an overview of an exemplary wireless communications system 100. In the exemplary embodiment, the communications system 100 includes one or more base stations 102 and one or more user terminals 104. In the exemplary embodiment, the communications system is configured to operate as a cellular radio network. A cellular radio network includes one or more base stations 102. Each base station 102 provides communications to different areas ("cells") (which may overlap) in order to provide radio coverage over a wider area than the area of one cell. The user terminals 104 may be fixed in location or mobile. Various handoff techniques may be used to allow moving user terminals 104 to communicate with different base stations 102 as such moving user terminals 104 pass into or through cells. In other embodiments, the communications system 100 may include point-to-point communications between user terminals 102 or one way communications links. Moreover, certain embodiments are discussed herein with reference to wireless communications using a radio frequency (RF) carrier. However, in other embodiments, the communications network may include other communication media such as optical signals or communications over wired connections.

Various embodiments of the system 100 may communicate over one or more channels in one or more RF frequency bands, such as frequency bands centered on 800 MHz, 850 MHz, 900 MHz, 1800 MHz, 1900 MHz, or 2000 MHz. Embodiments of the communications system 100 may include a multiple access protocol that determines how the communication system operates the radio link between the base station 102 and the user terminals 104. For example, the communications system 100 may use a code division multiple access (CDMA) based interface or a time division multiple access (TDMA) interface. In one exemplary embodiment, the communications system 100 includes a wideband CDMA (W-CDMA) interface utilizing a 5 MHz channel in the 1900 MHz band. Typically, only 3.84 MHz of this 5 MHz band is available for use.

For transmission over the communications channel, groups of bits or chips are mapped onto an "alphabet" of transmission symbols. Each symbol is encoded onto a carrier as a particular modulation state of the carrier. Each symbol of the alphabet may, for example, correspond to a selected phase, frequency, and/or amplitude state of the carrier. In the receiver, the state of the carrier is detected and the stream of symbols being transmitted is determined. The symbol stream is then decoded to reproduce the originally transmitted digital data.

Certain types of data transmission can be sensitive to retransmission delays, e.g. voice and common internet protocols such as TCP (Transport Control Protocol). For example, TCP connections generally do not fully utilize available channel bandwidth if transmission times (including times to retransmit lost data in lower level communication layers) are too large. In one embodiment, the bit error rate (BER) of the communications system 100, and thus ultimately the segment error rates of higher level protocols such as TCP, are reduced by performing a channel equalization of the received signal in accordance with aspects of the invention.

Figure 2:
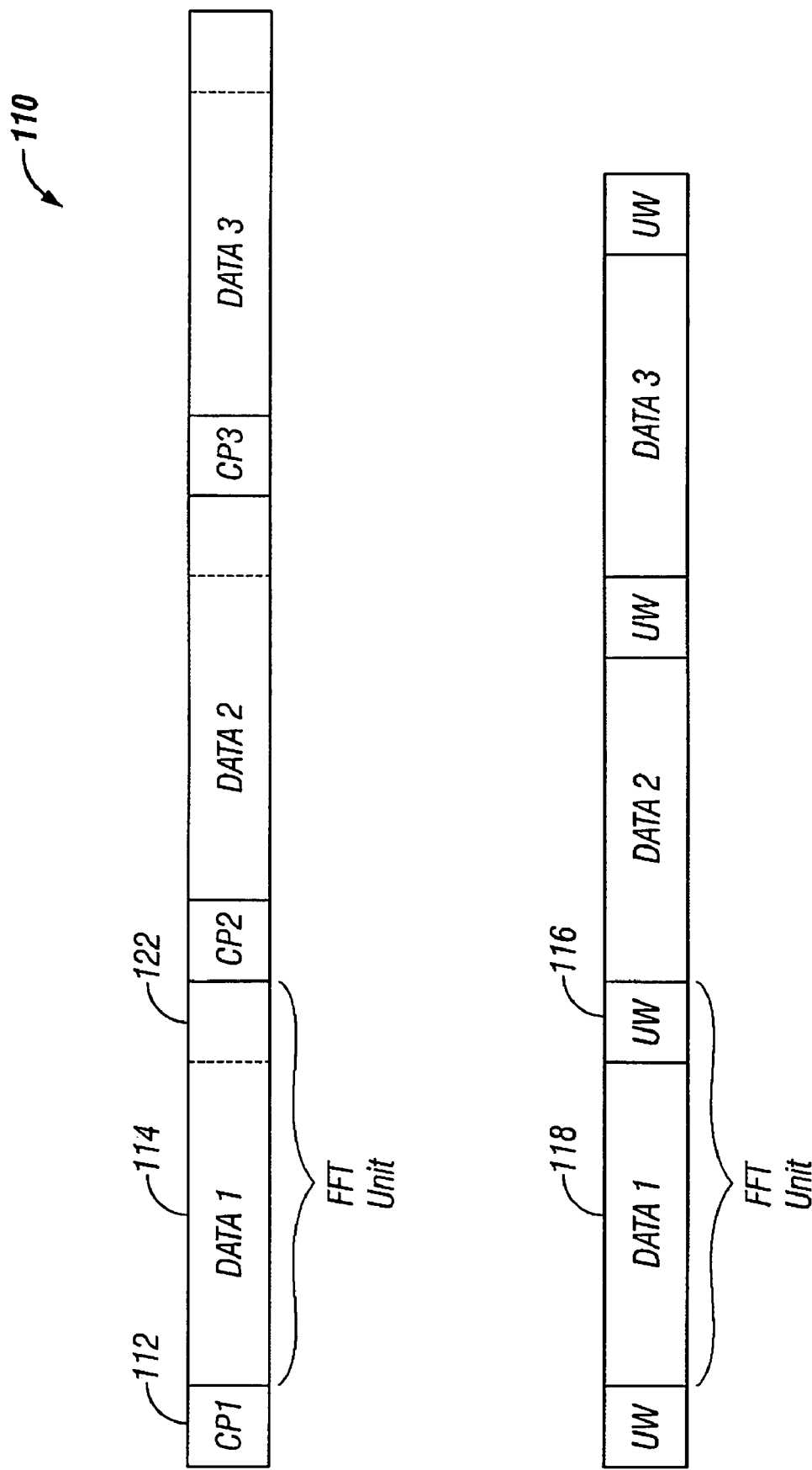
FIG. 2 is a block diagram illustrating two different exemplary signal formats for transmission in different embodiments of the system of FIG. 1.

FIG. 2 is a block diagram illustrating two different exemplary signal formats for transmission in different embodiments of the system of FIG. 1. In one embodiment, a cyclic prefix (CP) is used to facilitate and improve the frequency domain data processing. From each data block which is to be processed as one unit by Fast Fourier Transform (FFT), a portion 122 containing the last several symbols is copied into the front of the data block as a CP (block 112). In another embodiment, a known sequence called unique word (UW) is placed between consecutive data symbol blocks.

A channel refers to a communications medium over which a signal is transmitted. Generally, channels are not perfect. A channel generally has time and/or frequency dependent characteristics that affect a signal transmitted over the channel. Mathematically, a channel may be represented or characterized by a channel impulse response, h(n), that relates a signal input, e.g., transmitted, to the channel to a signal output, e.g., received, from the channel.

Equalization generally refers to a process by which a received signal is processed in response to dynamic characteristics of the channel over which the signal is sent. It may be performed in time domain or frequency domain. However, time domain equalizers may be computationally complex.

Figure 3:
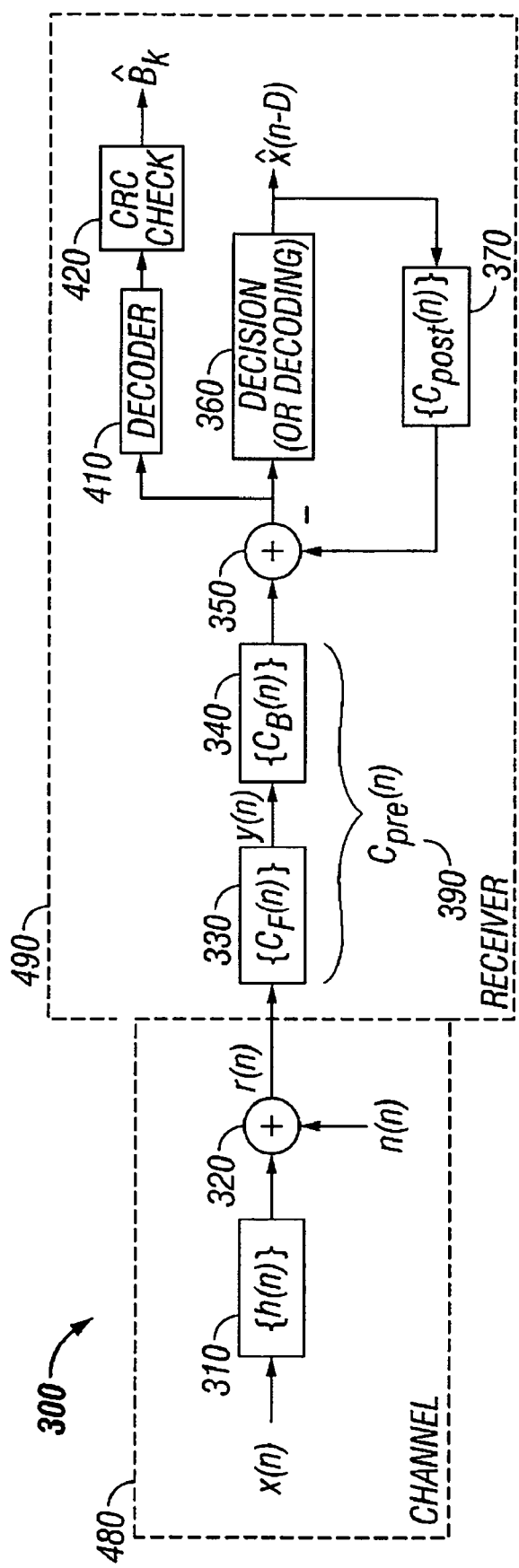
FIG. 3 shows a functional block diagram illustrating an exemplary channel/receiver operation.

FIG. 3 shows a functional block diagram illustrating an exemplary channel/receiver operation. In various embodiments, the functional blocks illustrated in FIG. 3 may be implemented by a processor executing software instructions, as a digital circuit, as an analog circuit, or by a combination thereof.

As shown in FIG. 3, a signal x(n) is fed into a channel 480 for transmission. In one embodiment, x(n) comprises a reference signal, e.g. a unique word (UW), and an unknown signal, the data. In one embodiment, x(n) comprises a sequence of symbols.

The channel 480 may be represented or characterized by its channel impulse response, h(n) 310. The operation of the channel may be represented as a convolution of the channel impulse response, h(n), with the transmitted signal x(n), e.g. x(n)*h(n).

While being transmitted over the channel, the signal x(n) is typically corrupted by additive noise n(n). This noise may arise from interference encountered in transmission, as in the case of radio signal transmission. The fact that this background noise adds into the signal during transmission is illustrated in FIG. 3 by an adder 320 and a noise signal n(n). The received signal r(n) can be calculated as follows:

$$r(n)=h(n)* x(n)+n(n) \qquad (1)$$

In the exemplary embodiment shown in FIG. 3, a signal r(n) is received by a receiver which is configured to reconstruct the transmitted signal x(n) from the received signal r(n). The block 330 is a linear equalizer represented by its impulse response $C_F(n)$.

In one embodiment, the block 330 is a linear Minimum Mean Square Error (MMSE) equalizer. Typically, the error comprises two components: the additive noise and the ISI. ISI generally refers to interference between pulses (corresponding to different symbols in the data) in a signal that may occur when adjacent symbols overlap with each other.

The linear MMSE equalizer $c_F(n)$ takes the frequency response $$C_F(f) = \frac{H^*(f)S_x(f)}{|H(f)|^2 S_x(f) + S_n(f)} \quad (2)$$

where $S_x(f)$ and $S_n(f)$ are the power spectrum of x(n) and n(n), H(f) is the frequency response of the channel, and H*(f) is the complex conjugate of H(f). The power spectrum of a signal measures the strength of the different frequencies that form the signal. Both $S_x(f)$ and $S_n(f)$ can be derived from previously received data or they are often assumed to be flat over the signal bandwidth. The resulting MMSE composite error $$e(n)=x(n)-y(n) \quad (3)$$

has a power spectrum $$S_e(f) = \frac{S_x(f)S_n(f)}{|H(f)|^2 S_x(f) + S_n(f)} \quad (4)$$

The time domain signal of the equalizer output is generated by $$y(n)=c_F(n)*r(n)=c_F(n)*h(n)*x(n)+c_F(n)*n(n) \quad (5)$$

In another embodiment, the filter 330 is a linear Zero Forcing equalizer which is a filter configured to force the ISI component in its output to zero. In this embodiment, the error spectrum would be $$S_e(f) = \frac{S_n(f)}{|H(f)|^2} \quad (6)$$

The composite error spectrum is not flat in either MMSE or ZF unless the channel spectrum H(f) is flat, though the original data spectrum and the noise spectrum are flat. In many cases, the channel is highly frequency selective, so the channel spectrum H(f) is not flat. Therefore, the error signal is not white. In other embodiments, filters other than MMSE or ZF equalizer can also be used.

The filter 330 can be realized in either time domain or frequency domain. In one embodiment, the linear frequency domain equalization (FDE) processing (either MMSE or ZF) is done after applying discrete Fourier transform to a received signal block which has a UW part of length M samples. The frequency samples in the FDE output Y(f) are then converted to time domain samples y(n) by Inverse Discrete Fourier Transform (IDFT).

A filter 340 represented by its impulse response $c_B(n)$ is placed after the filter 330 to further reduce the colored composite noise contained in samples y(n). In one embodiment, the block 340 is a L-tap monic prediction error generation filter configured to suppress and whiten the colored composite noise. A linear prediction filter forms an estimate of the current sample of a discrete-time random process from a linear combination of the past samples. It uses the correlation between samples to construct an informed estimate of the current sample based on the past.

In one embodiment, the filter 340 can be designed by using the error sequence between the output samples y(n) from the filter 330 and the reference signal, e.g., UW, $$e_{UW}(n)=x_{UW}(n)-y(n), n=0,1,\ldots,M-1. \quad (7)$$

Then the L-tap monic prediction error generation filter weight $$\vec{c}_B=[1 \; -p(1) \; -p(2) \ldots -p(L-1)]^T=[1 \; -\vec{p}^T]^T \quad (8)$$

is design to minimize $$\varepsilon = E|c_B(n)*e_{UW}(n)|^2 \quad (9)$$

$$= E\left|e_{UW}(n) - \sum_{i=1}^{L-1} p(i)e_{UW}(n-i)\right|^2 \equiv E|z(n)|^2.$$

One method of solving this problem includes application of a statistical solution known as the least-square (LS) approach, where the coefficient of the linear prediction filter $\vec{p}=[p(1) \ldots p(L-1)]^t$ is optimized to minimize $$\tilde{\varepsilon} = \sum_{n=L-1}^{M-1} |z(n)|^2.$$

The optimal LS solution may be obtained as follows:

$$\vec{p} = (E_{UW}^H E_{UW})^{-1} E_{UW}^H \cdot \vec{e}_{UW}. \quad (10)$$

where $$\underbrace{\begin{bmatrix} e_{UW}(L-1) \\ e_{UW}(L) \\ \vdots \\ e_{UW}M-1 \end{bmatrix}}_{\vec{e}_{UW}} = \underbrace{\begin{bmatrix} e_{UW}(L-2) & e_{UW}(L-3) & \cdots & e_{UW}(0) \\ e_{UW}(L-1) & e_{UW}(L-2) & \cdots & e_{UW}(1) \\ \vdots & \vdots & \ddots & \vdots \\ e_{UW}(M-2) & e_{UW}(M-3) & \cdots & e_{UW}(M-L) \end{bmatrix}}_{E_{UW}} \begin{bmatrix} p(1) \\ p(2) \\ \vdots \\ p(L-1) \end{bmatrix} + \begin{bmatrix} z(L-1) \\ z(L) \\ \vdots \\ z(M-1) \end{bmatrix} \quad (11)$$

and L should be set to satisfy $L \leq M/2+1$. The filters 330 and 340 do not have to be two separate filters. They can be replaced by one filter with an impulse response $$c_{pre}(n)=c_F(n)*c_B(n) \quad (12)$$

The output from filter 340 is then processed by a decision (negative) feedback loop, which comprises an adder 350, a decision unit 360, and a feedback filter 370 represented by its impulse response $c_{post}(n)$.

In one embodiment, the transmitted signal x(n) is a sequence of symbols drawn from an alphabet. Because of additive noise and signal distortion, the signal received by the receiver and filtered by the pre-filter 390 may not correspond exactly to any allowed symbol of the alphabet. The decision unit 360 constructs an estimate or guess of the actual transmitted symbol from the signal at its input such that the output of the decision unit belongs to the alphabet. The symbol sequence at the output of the decision unit 360 is called hard decision symbol sequence. In one embodiment, the decision device 360 can be a quantizer which applies a series of decision thresholds to its input signal.

The feedback filter 370 is a prediction filter having substantially the same coefficients as the filter 340. The coefficients of the filter 370 can be determined by:

$$\vec{c}_{post} = [0 - p(1) - p(2) \ldots - p(L-1)]^T \quad (13)$$

Thus, only the first coefficient is different between the two filters.

The decoder 410 takes the symbol sequence at the input of the decision unit 360 and decodes it into a bit sequence. A CRC-check unit 420 then takes the bit sequence to check if any error exists in decoding and to correct any correctible bit errors, and outputs a bit sequence $\hat{B}_k$. In other embodiments, the decoder 410 can be put after the decision unit 360 instead. Also the CRC-Check can be replaced by other decoding error check schemes.

The DFE structure in FIG. 3 is optimal only when there is no error of the feedback signal, as it should perfectly revert the distortion of the signal introduced by the filter 340. However, in reality, there is typically a decision error in the feedback loop. When the decision unit makes incorrect decisions, the ISI correction becomes flawed, interfering with future decisions. This is called error propagation.

To solve this problem, the impact of the distortion stemming from incorrect decisions made by the decision unit 360 should be attenuated. To accomplish this, filters 340 and 370 may be modified as a function of the decision reliability after each cycle of decision. However, this requires high computational complexity, especially if any iterative refinement of the filters is performed.

Figure 4:
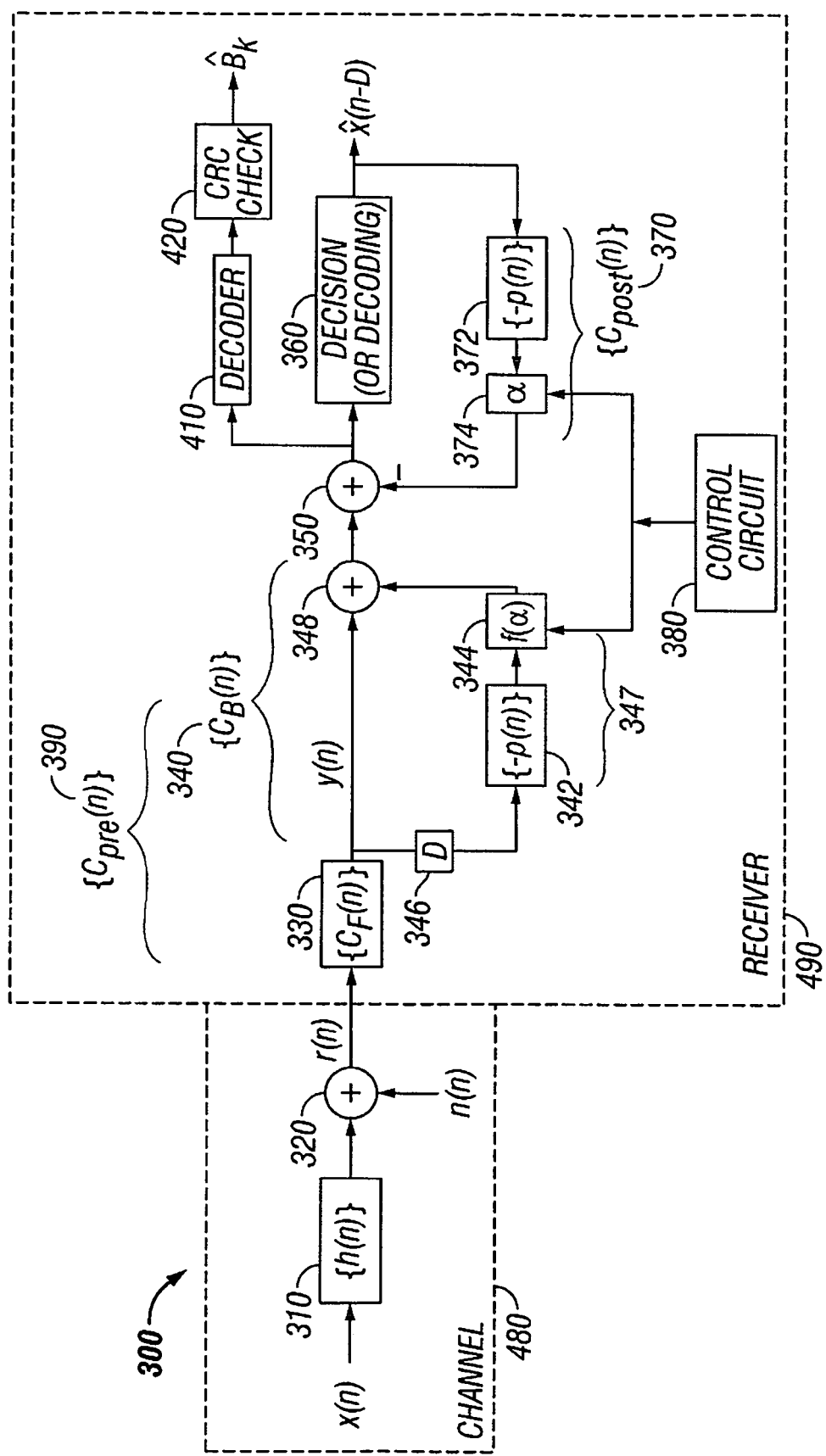
FIG. 4 shows a functional block diagram illustrating an exemplary channel/receiver operation wherein a reliability factor is incorporated into a pre-designed DFE.

FIG. 4 shows a functional block diagram illustrating an exemplary channel/receiver operation wherein a simple but plausible incorporation of the reliability factor is made into a pre-designed DFE. This embodiment avoids the computational complexity of the receiver of FIG. 3.

As shown in FIG. 4, a multiplicative reliability factor α and an associated multiplicative factor f(α) are incorporated in the prediction filters 372 and 342 whose coefficients are determined by a sequence {−p(n)}. There are many different choices of the pre-defined mapping relation f(α). In one embodiment, f(α)=α. In another embodiment, f(α)=α^2. Now the coefficients of the filters 340 and 370 are $$\vec{c}_B = [1 - f(\alpha)p(1) - f(\alpha)p(2) \ldots - f(\alpha)p(L-1)]^T = [1 - f(\alpha) \vec{p}^T]^T \quad (14)$$

and $$\vec{c}_{post} = [0 - \alpha p(1) - \alpha p(2) \ldots - \alpha p(L-1)]^T. \quad (15)$$

In the embodiment of FIG. 4, the filter 340 is realized by a structure comprising a time delay unit 346, a prediction filter 342, a multiplicative scalar 344 with a gain of f(α), and an adder 348. The time delay unit 346 is added to achieve synchronization between the output from the filter 342 and the decision feedback signal, because the decision unit 360 introduces a symbol delay. The coefficients of the filter 342 are determined by a sequence {−p(n)}. It will be appreciated that the filter 342 and the scalar 344 can be realized as one filter 347.

The filter 370 is realized by placing a multiplicative scalar 374 with a gain of α in series with a filter 372 whose coefficients are determined by a sequence {−p(n)}. The filter 370 can also be realized as one filter.

The reliability factor α is set to 1 if the decision error is almost zero, while it is set to 0 if the decision is not reliable at all. Depending on the reliability of the decision process, α may be set to a value ranging from 0 to 1.

In one embodiment, a control circuit 380 is configured to generate a value between 0 and 1 for the reliability factor and adjust scalars 344 and 374 accordingly. There are various ways to generate a value for the reliability factor such that a higher reliability results in α closer to 1. In one embodiment, the reliability factor can be generated by using a part of UW which was not used for the generation of {p(n)}.

In another embodiment, the reliability factor can be generated by comparing the symbol sequence at the output of the decision unit 360 and the regenerated symbol sequence from the decoded bit sequence $\hat{B}_k$. When a frame (a bit sequence) passes a CRC-check, the transmitted symbol sequence can be regenerated from $\hat{B}_k$ by using the same conversion scheme from bits to symbols as used by the transmitter.

The metric for providing the reliability factor can vary in different embodiments. In one embodiment, the metric for the reliability factor may be an accumulated symbol decision success probability or a normalized correlation between a reference symbol sequence and the hard decision symbol sequence at the output of the decision unit 360 which is produced in response to a transmitted reference symbol.

Figure 5:
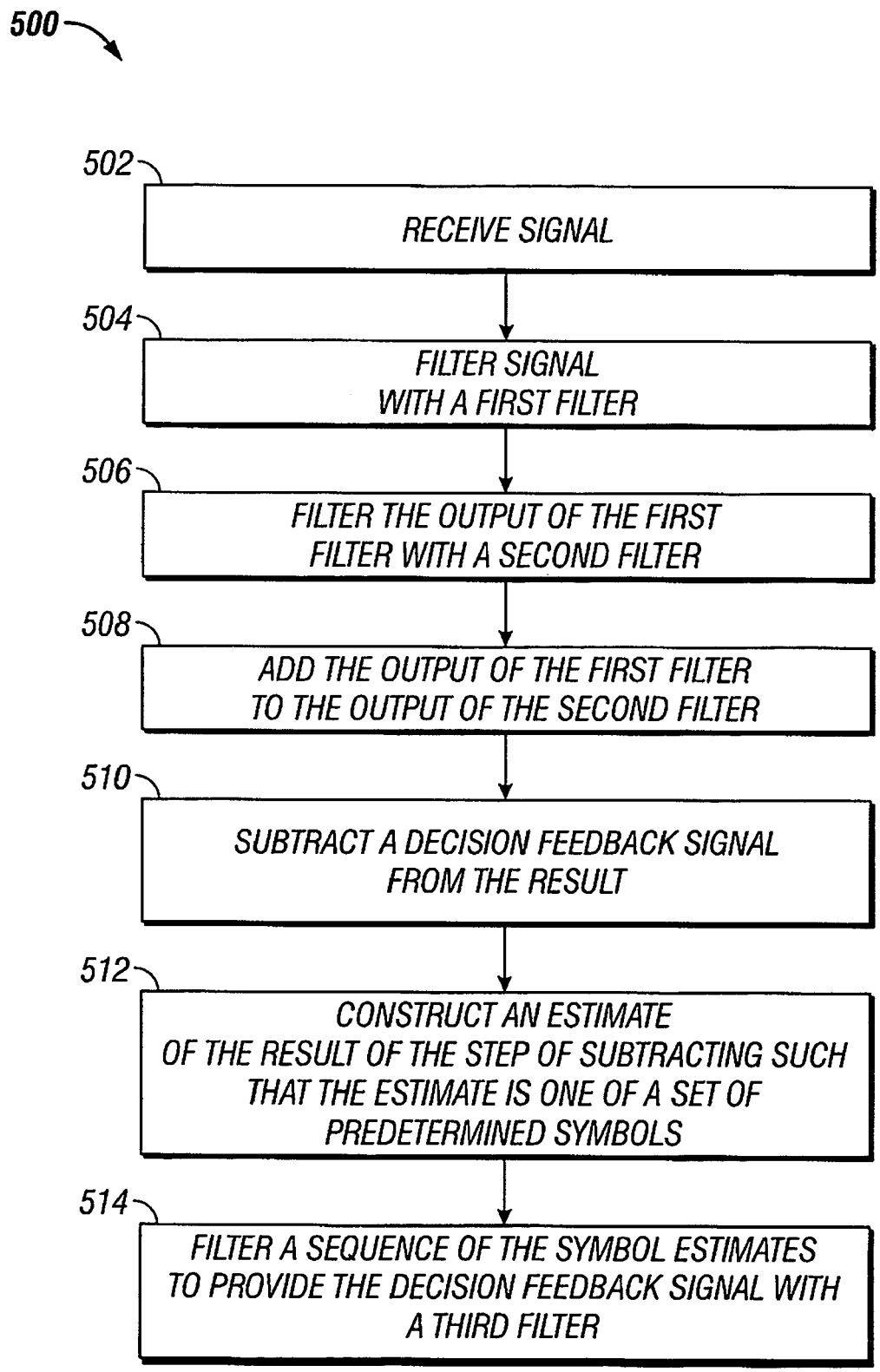
FIG. 5 is a flowchart illustrating an exemplary method 500 of equalizing a received signal in the exemplary system 100 of FIG. 1.

FIG. 5 is a flowchart illustrating an exemplary method 500 of equalizing a received signal in the exemplary system 100 of FIG. 1. The method 500 begins at a block 502 in which the receiver receives a signal r(n) transmitted over a channel. Moving to a block 504, r(n) is filtered by a first filter such as the linear equalizer. Next at a block 506, a second filter filters the output from the first filter. Proceeding to a block 508, the output from the first filter is added to the output from the second filter. Moving to a block 510, a feedback signal from the output of a third filter is subtracted from the resulted signal in the block 508. Next at a block 512, the decision unit constructs an estimate of the transmitted symbol from the signal at its input, e.g., the result signal of the block 510, such that the estimate is one of a set of predetermined symbols, e.g., the alphabet. Moving to a block 514, a third filter takes a sequence of the symbol estimates from the decision unit and produces a decision feedback signal.

Figure 6:
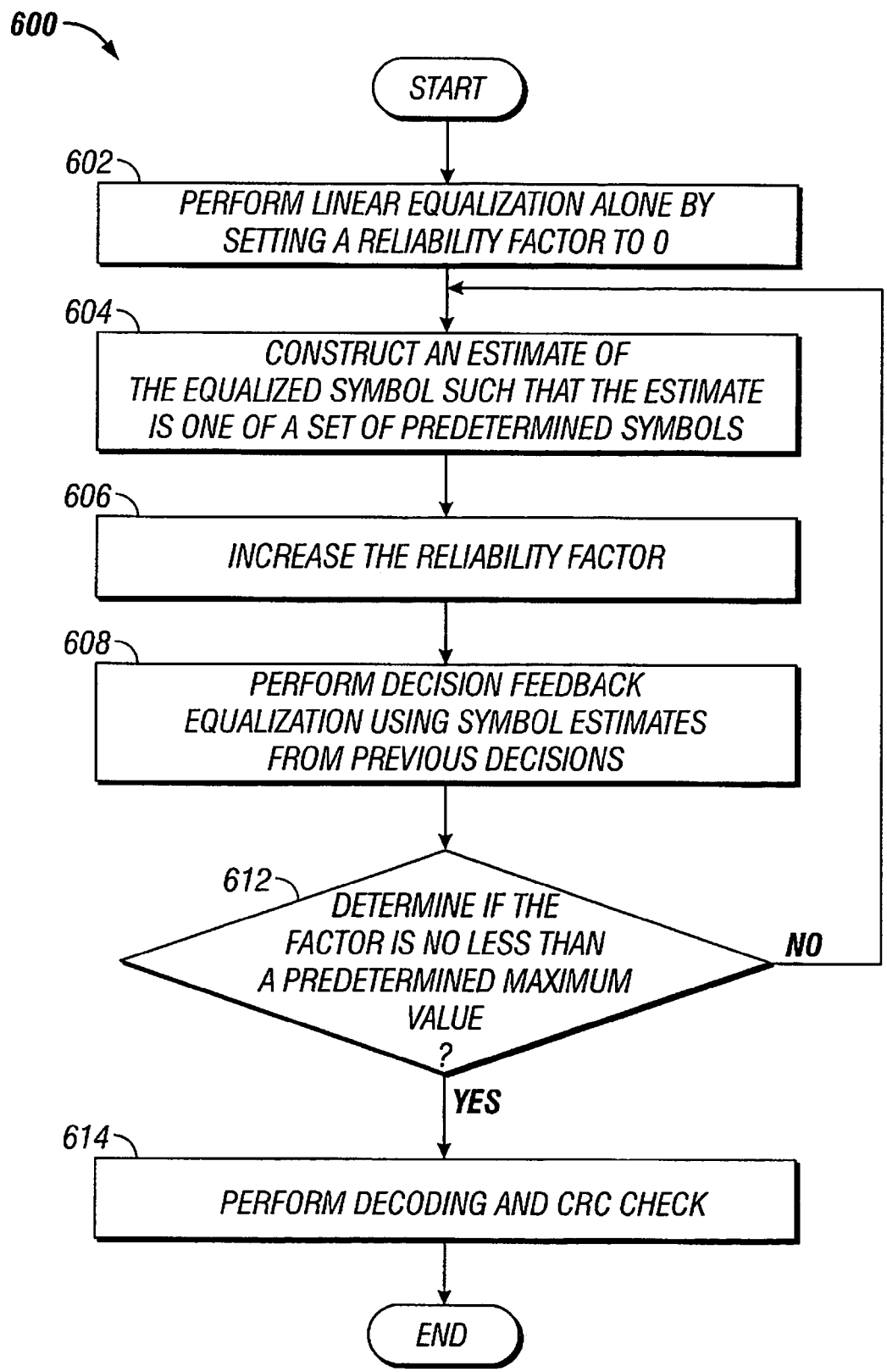
FIG. 6 shows a flowchart illustrating an exemplary method of soft-switching between linear equalization and DFE equalization in the exemplary system 100 of FIG. 1.

FIG. 6 shows a flowchart illustrating an exemplary method of soft-switching between linear equalization and DFE equalization. The reliability factor α having a value ranging from 0 to 1 controls to what extent the decision feedback signal is relied on for equalization. When α is set to 0, no decision feedback is applied. The receiver applies only linear equalization to the received signal r(n). When the reliability factor is set to 1, full decision feedback is applied.

The method 600 begins at a block 602 in which the control circuit sets the reliability factor α to zero. Moving to a block 604, a decision unit constructs an estimate of the symbol at its input such that the estimate is one of a set of predetermined symbols, e.g., the alphabet. Next at a block 606, a control circuit increases the reliability factor α by a small value, such as 0.1. Proceeding to a block 608, the DFE processing is performed with a small non-zero α by using the sequence of symbol estimates from previous decisions. At a block 612, the control circuit determines whether a predetermined maximum value has been reached or exceeded. This value is typically 1, but could be less than 1. If the answer is no, the method goes back to the block 604 and starts another iteration. Otherwise, next at a block 614, the soft symbols (i.e, input of the decision unit) are fed to the decoder and data decoding is performed.

Figure 7:
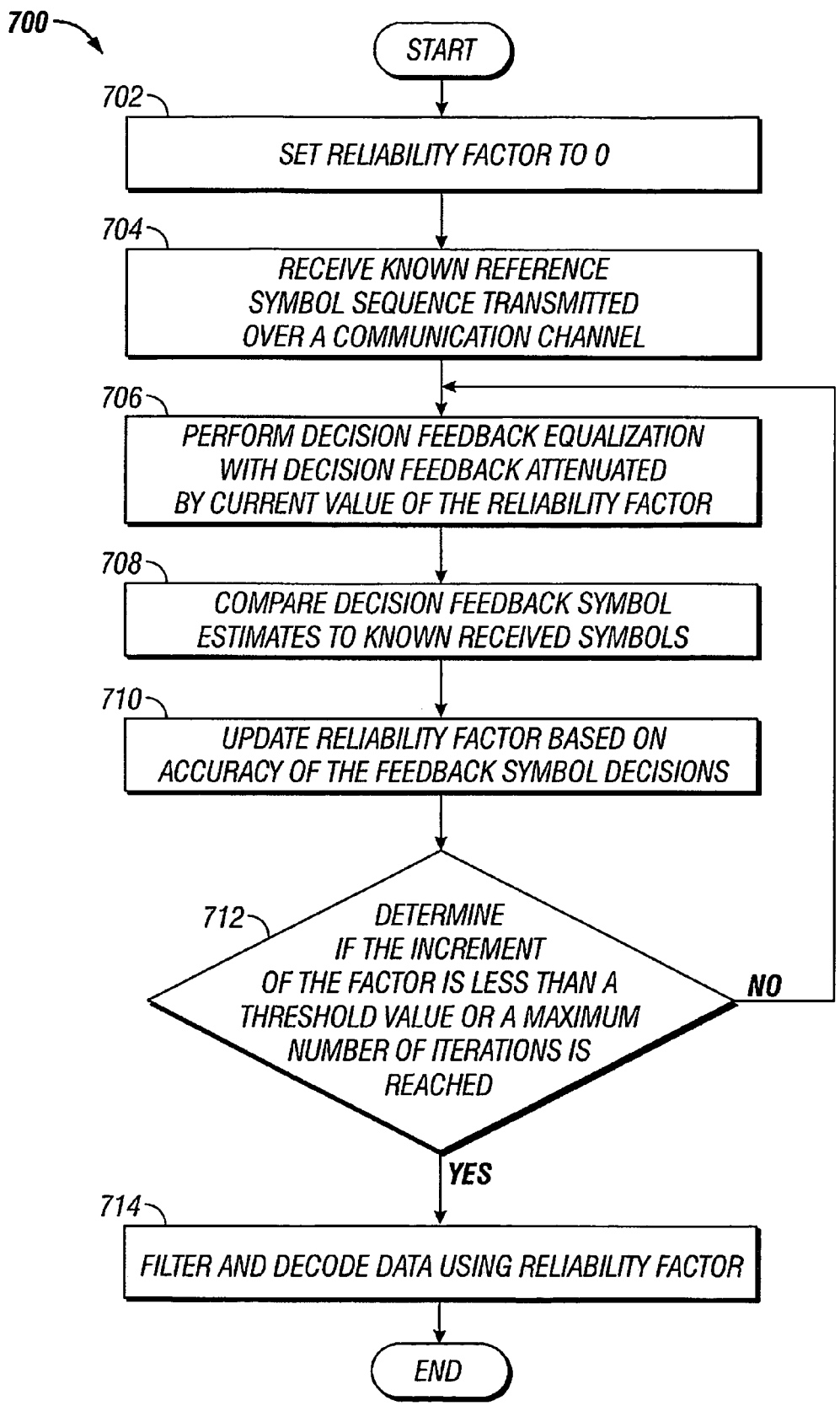
FIG. 7 shows a flowchart illustrating another exemplary method of soft-switching between linear equalization and DFE equalization in the exemplary system 100 of FIG. 1.

FIG. 7 shows a flowchart illustrating still another method of soft-switching between linear equalization and DFE equalization. In the exemplary embodiment, by comparing the known reference symbols and their estimates generated by the decision unit, we can adaptively update the reliability factor instead of blindly increasing it at each iteration. The iteration process completes when there is no more significant change of the reliability factor or after a predetermined number of iterations. The method begins at a block 702 in which the control circuit sets the reliability factor α to zero. Moving to a block 704, the receiver receives a known reference symbol sequence which is transmitted over the communication channel. Next at a block 706, the receiver performs decision feedback equalization with decision feedback signal attenuated by the current value of the reliability factor. During this step, a decision unit constructs an estimate of the symbol at its input. The decision feedback signal is generated based on the symbol estimates. Next at a block 708, the control circuit compares decision feedback symbol estimates to the known reference symbols received, therefore determining accuracy of the feedback symbol decisions. Proceeding to a block 710, the control circuit updates the reliability factor based on accuracy of the feedback symbol decisions. At a block 712, the control circuit determines whether the increment of the factor is less than a predetermined threshold value or the maximum number of iterations is reached. If the answer is no, the method goes back to the block 706 and starts another iteration. Otherwise, next at a block 714, the receiver filters and decodes data with the reliability factor set to its current value.

Figure 8:
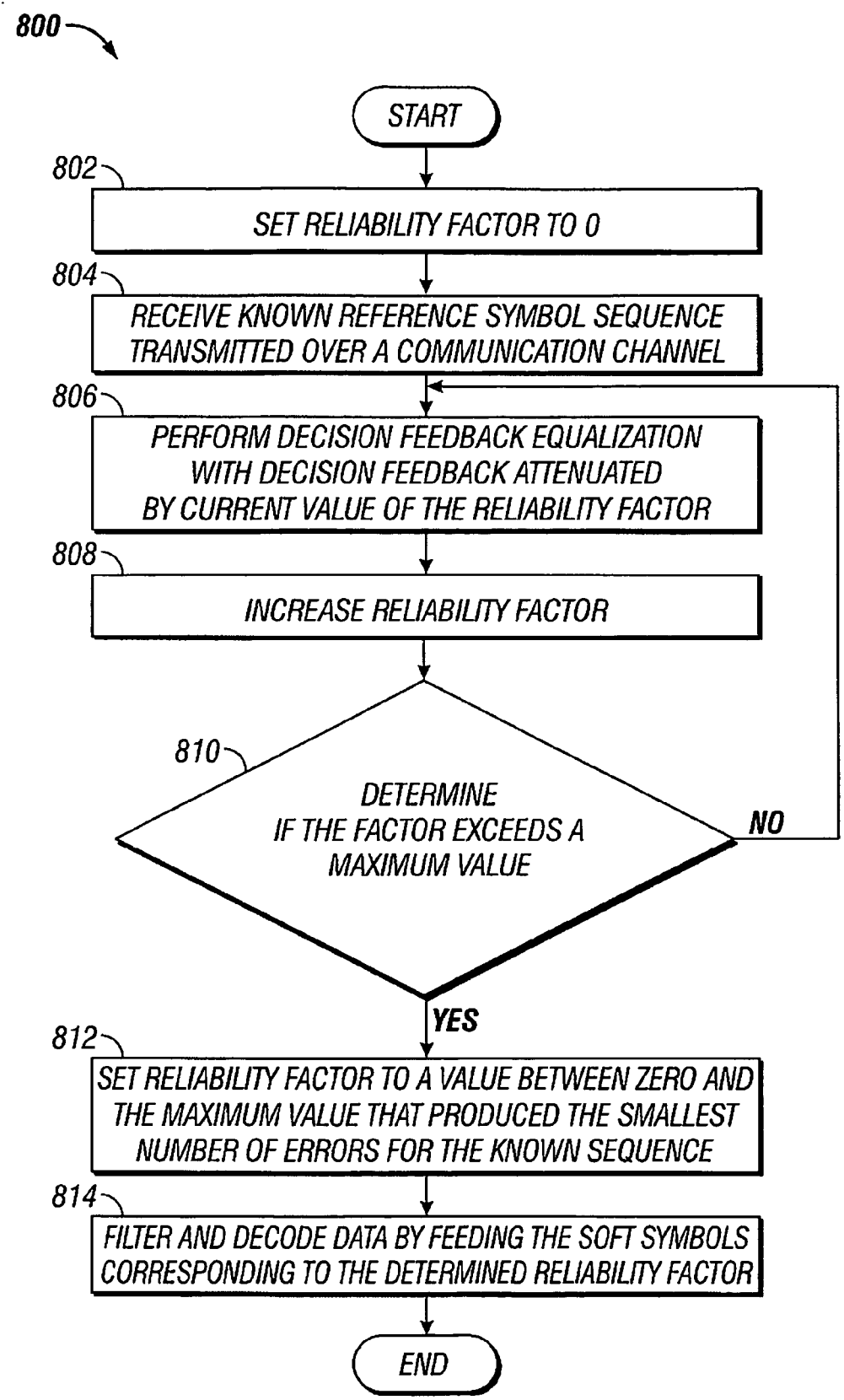
FIG. 8 shows a flowchart illustrating another exemplary method of soft-switching between linear equalization and DFE equalization in the exemplary system 100 of FIG. 1.

FIG. 8 shows a flowchart illustrating still another method of soft-switching between linear equalization and DFE equalization. In the exemplary embodiment, an iterative approach is taken in which the reliability factor is increased slowly from 0 to a predetermined maximum value. After the iteration ends, the reliability factor is set to a value that produced the smallest number of errors in estimating the received known symbol sequence. The method begins at a block 802 in which the control circuit sets the reliability factor α to zero. Moving to a block 804, the receiver receives a known reference symbol sequence which is transmitted over the communication channel. Next at a block 806, the receiver performs decision feedback equalization with decision feedback signal attenuated by the current value of the reliability factor. During this step, a decision unit constructs an estimate of the symbol at its input. The decision feedback signal is generated based on the symbol estimates. Next at a block 808, the control circuit increases the reliability factor α by a small value, such as 0.1. Proceeding to a block 810, the control circuit determines whether a predetermined maximum value has been reached or exceeded. This value is typically 1, but could be less than 1. If the answer is no, the method goes back to the block 806 and starts another iteration. Otherwise, next at a block 812, the control circuit sets the reliability factor to a value between zero and a predetermined maximum value such that the chosen value produced the smallest number of errors in constructing feedback symbol estimates. Whether there is an error is determined by comparing decision feedback symbol estimates to the known reference symbols received. Moving to a block 814, the receiver filters and decodes data by feeding the soft symbols corresponding to the determined reliability factor.

Figure 9:
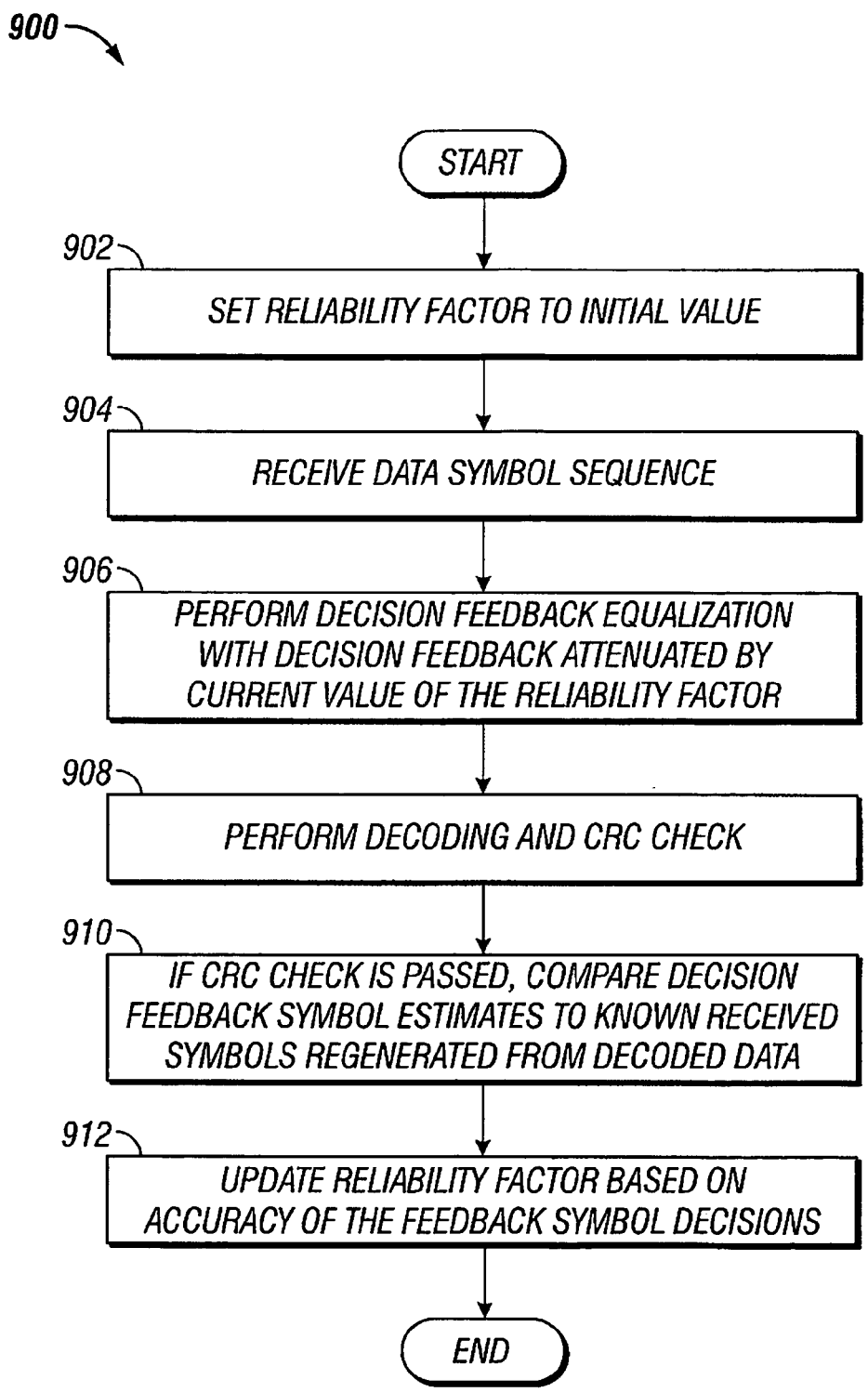
FIG. 9 shows a flowchart illustrating another exemplary method of soft-switching between linear equalization and DFE equalization in the exemplary system 100 of FIG. 1.

FIG. 9 shows a flowchart illustrating another exemplary method of soft-switching between linear equalization and DFE equalization in the exemplary system 100 of FIG. 1. In this embodiment, the reliability factor α is periodically updated based on received symbols regenerated from decoded data if CRC check is passed. The method 900 starts at a block 902 in which the control circuit sets the reliability factor α to an initial value, for example, zero. Moving to a block 904, the receiver receives a data symbol sequence transmitted over the communication channel. Next at a block 906, the receiver performs decision feedback equalization with decision feedback signal attenuated by the current value of the reliability factor. During this step, a decision unit constructs an estimate of the symbol at its input. The decision feedback signal is generated based on the symbol estimates. Proceeding to a block 908, the soft symbols are fed to the decoder. Data decoding and CRC check are then performed sequentially. Next at a block 910, the control circuit compares decision feedback symbol estimates to received symbols regenerated from decoded data in order to determine accuracy of the feedback symbol decisions, if CRC check is passed. Next at a block 912, the control circuit updates the reliability factor based on accuracy of the feedback symbol decisions.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein can be interchanged without departing from the scope of the invention. These steps may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A device configured to process a signal comprising a symbol sequence transmitted over a channel, said device comprising:
    a first filter having an input receiving said signal; and
    a feedback loop comprising a subtractor, a decision unit, and a second filter, wherein said subtractor is connected to subtract a decision feedback signal produced by said second filter from an output of said first filter, wherein said decision unit has an input connected to an output of said subtractor and an output connected to the input of said second filter, and wherein the second filter has coefficients weighted by a scalar value comprising a measure of decision reliability, the scalar value ranging between 0 and 1, wherein varying the scalar value adjusts the degree to which the decision feedback signal is relied upon for equalization,
    wherein the symbol sequence comprises a known symbol sequence positioned between consecutive data signal blocks in the symbol sequence and the first filter employs first filter coefficients selected at least in part using the known symbol sequence, and
    wherein the symbol sequence comprises a second known symbol sequence and the filter coefficients of the second filter and filter coefficients of a third filter are set using the difference between an output symbol sequence of the first filter and said second known symbol sequence.

2. The device of claim 1, further comprising a circuit configured to generate a value for said scalar value.

3. The device of claim 2, wherein the scalar value is generated based at least in part on accuracy of an output signal of the decision unit relative to the known symbol sequence.

4. The device of claim 2, wherein said circuit is configured to compare previous symbol sequences produced at the output of the decision unit and regenerated symbol sequences from a decoder.

5. A device configured to process a signal comprising a symbol sequence transmitted over a channel, said device comprising:
    a first filter having an input receiving said signal;
    a delay unit having its input coupled to the output of said first filter;
    a second filter having its input coupled to the output of said delay unit;
    an adder connected to sum the output of said first filter and the output of said second filter; and
    a decision feedback loop comprising a subtractor, a decision unit, and a third filter having filter coefficients associated with filter coefficients of said second filter, wherein said subtractor is connected to subtract the output of said third filter from the output of said adder and said decision unit has an input connected to the output of said subtractor and an output connected to the input of said third filter,
    wherein varying the filter coefficients of the second and third filters adjusts the degree to which output from the decision unit is relied upon for equalization, and wherein the symbol sequence comprises a known symbol sequence, and the device employs filter coefficients selected at least in part using the known symbol sequence positioned between consecutive data signal blocks in the transmitted symbol sequence,
    wherein the symbol sequence comprises a second known symbol sequence and the filter coefficients of the second and third filters are set using the difference between an output symbol sequence of the first filter and said second known symbol sequence,
    wherein the output of the second filter is weighted based on a first scalar value ranging from 0 to 1 and the output of the third filter is weighted based on a second scalar value ranging from 0 to 1.

6. The device of claim 5, wherein the first and second scalar values are related to each other through a pre-defined mapping relation.

7. The device of claim 5, wherein each scalar value represents a reliability factor of a decision feedback input signal.

8. The device of claim 6, wherein each scalar value represents a reliability factor of a decision feedback input signal.

9. The device of claim 5, wherein said first filter comprises a linear equalizer.

10. The device of claim 5, wherein said first filter comprises a linear Minimum Mean Square Error (MMSE) equalizer.

11. The device of claim 5, wherein said first filter comprises a linear Zero Forcing (ZF) equalizer.

12. The device of claim 8, further comprising a circuit configured to generate a value for said reliability factor.

13. The device of claim 12, wherein the value of the reliability factor is generated based at least in part on the known symbol sequence.

14. The device of claim 12, wherein said circuit generates the value for said reliability factor by comparing previous symbol sequences at the output of the decision unit and regenerated symbol sequences from a decoder.

15. A method of processing a received signal, said method comprising soft-switching between linear equalization and decision feedback equalization;
    wherein the soft-switching between linear equalization and decision feedback equalization comprises adjusting the degree to which decision feedback affects output of a first filter;
    wherein the soft-switching between linear equalization and decision feedback equalization employs a known symbol sequence positioned between consecutive data signal blocks in the received signal, and soft-switching comprises changing a reliability factor having a value ranging from 0 to 1 to control to what extent a decision feedback signal is used for equalization; and wherein the soft-switching between linear equalization and decision feedback equalization employs a second known symbol sequence, wherein filter coefficients of a second filter and filter coefficients of a third filter are set using the difference between an output symbol sequence of the first filter and the second known symbol sequence.

16. The method of claim 15, wherein the soft-switching comprises:
performing linear equalization alone by setting the reliability factor to 0;
constructing an estimate of the equalized symbol such that the estimate is one of a set of predetermined symbols;
increasing said reliability factor;
performing the decision feedback equalization using symbol estimates from previous constructions;
repeating steps of constructing, increasing and performing decision feedback equalization until the reliability factor is no less than a pre-determined maximum value; and
wherein no feedback and full feedback are used with the reliability factor set to 0 and 1 respectively.

17. The method of claim 15, wherein soft-switching comprises:
performing linear equalization alone by setting a reliability factor to 0;
constructing an estimate of the equalized symbol such that the estimate is one of a set of predetermined symbols;
updating said reliability factor;
performing the decision feedback equalization using symbol estimates from previous constructions;
repeating steps of constructing, updating and performing decision feedback equalization until the increment of the reliability factor is less than a predetermined threshold value or until a maximum number of iterations is reached; and
wherein no feedback and full feedback are used with the reliability factor set to 0 and 1 respectively.

18. The method of claim 17, further comprising performing decoding, wherein said updating comprises comparing previous symbol estimates and regenerated symbol sequences from decoding.

19. The method of claim 17, wherein said updating is based at least in part on the known symbol sequence.

20. The method of claim 15, wherein soft-switching comprises:
performing linear equalization alone by setting the reliability factor to 0;
constructing an estimate of the equalized symbol such that the estimate is one of a set of predetermined symbols;
performing the decision feedback equalization using symbol estimates from previous decisions;
performing decoding and cyclic redundancy code (CRC) check;
updating said reliability factor if the CRC check is passed;
repeating steps of constructing, performing decision feedback equalization, performing decoding and the CRC check, and updating to process transmitted symbol sequences; and
wherein no feedback and full feedback are applied with the reliability factor set to 0 and 1 respectively.

21. The method of claim 20, wherein said updating comprises comparing previous symbol estimates and regenerated symbol sequences from decoding.

22. A method of processing a received signal, said method comprising:

receiving a signal;
filtering said signal with a first filter;
filtering the output of said first filter with a second filter;
adding the output of said first filter to the output of the second filter;
subtracting a decision feedback signal from a result of the adding to provide a signal for decision;
constructing an estimate of a result symbol of the subtracting such that the estimate is one of a set of predetermined symbols; and
filtering a sequence of symbol estimates to provide said decision feedback signal with a third filter having filter coefficients associated with filter coefficients of said second filter;
wherein varying the filter coefficients of the second and third filters adjusts the degree to which output from the decision feedback signal is relied upon for equalization, and wherein the signal for decision is provided using filter coefficients selected at least in part using a known symbol sequence positioned between consecutive data signal blocks in the signal;
wherein the signal comprises a second known symbol sequence and the filter coefficients of the second and third filters are set using the difference between the output of the first filter and the second known symbol sequence; and
wherein outputs of the second and third filters are weighted based on a scalar value ranging from 0 to 1.

23. A device for processing a signal, said device comprising:
means for receiving said signal; and
means for soft-switching between linear equalization and decision feedback equalization,
wherein the means for soft-switching between linear equalization and decision feedback equalization comprise means for adjusting the degree to which decision feedback affects output of a first filter, and wherein the means for soft switching between linear equalization and decision feedback equalization employ a known symbol sequence positioned between consecutive data signal blocks in the signal, and the means for soft-switching comprise means for changing a reliability factor having a value ranging from 0 to 1 to control to what extent a decision feedback signal is used for equalization,
wherein the means for soft-switching between linear equalization and decision feedback equalization employs a second known symbol sequence, wherein filter coefficients of a second filter and filter coefficients of a third filter are set using the difference between an output symbol sequence of the first filter and the second known symbol sequence.

24. The device of claim 23, wherein said means for soft-switching comprises:
means for performing linear equalization alone by setting the reliability factor to 0;
means for constructing an estimate of the equalized symbol such that the estimate is one of a set of predetermined symbols;
means for increasing said reliability factor;
means for performing the decision feedback equalization using symbol estimates from previous constructions; and
wherein no feedback and full feedback are used with the reliability factor set to 0 and 1 respectively.

25. The device of claim 23, wherein said means for soft-switching comprises:

means for performing linear equalization alone by setting the reliability factor to 0;
means for constructing an estimate of the equalized symbol such that the estimate is one of a set of predetermined symbols;
means for updating said reliability factor; and
means for performing the decision feedback equalization using symbol estimates from previous constructions,
wherein no feedback and full feedback are used with the reliability factor set to 0 and 1 respectively.

26. The device of claim 25, furthering comprising means for performing decoding, wherein said means for updating comprises means for comparing previous symbol estimates and regenerated symbol sequences from decoding.

27. The device of claim 25, wherein said updating is based at least in part on the known symbol sequence.

28. The device of claim 23, wherein said means for soft-switching comprises:
means for performing linear equalization alone by setting the reliability factor to 0;
means for constructing an estimate of the equalized symbol such that the estimate is one of a set of predetermined symbols;
means for performing the decision feedback equalization using symbol estimates from previous constructions;
means for performing decoding and cyclic redundancy code (CRC) check; and
means for updating said reliability factor if the CRC check is passed;
wherein no feedback and full feedback are applied with the reliability factor set to 0 and 1 respectively.

29. The device of claim 28, wherein said means for updating comprises means for comparing previous symbol estimates and regenerated symbol sequences from decoding.

30. A device configured to process a signal, the device comprising:
means for filtering said signal with a first filter;
means for filtering the output of said first filter with a second filter;
means for adding the output of said first filter to the output of the second filter;
means for subtracting a decision feedback signal from a result of adding the output of said first filter to the output of the second filter to provide a signal for constructing;
means for constructing an estimate of a result of subtracting a decision feedback signal from the result of adding such that the estimate is one of a set of predetermined symbols; and
means for filtering a sequence of symbol estimates to provide said decision feedback signal with a third filter having filter coefficients associated with filter coefficients of said second filter,
wherein varying the filter coefficients of the second and third filters adjusts the degree to which the decision feedback signal is relied upon for equalization and wherein the signal for constructing is provided using filter coefficients selected at least in part using a known symbol sequence positioned between consecutive data signal blocks in the signal;
wherein the signal comprises a second known symbol sequence and the filter coefficients of the second and third filters are set using the difference between the output of the first filter and the second known symbol sequence; and
wherein outputs of the second and third filters are weighted based on a scalar value ranging from 0 to 1.

31. A computer-readable storage medium encoded thereon with instructions that when executed cause an apparatus to perform a method of processing a received signal, the method comprising soft-switching between linear equalization and decision feedback equalization,
wherein the soft-switching between linear equalization and decision feedback equalization comprises adjusting the degree to which decision feedback affects output of a first filter,
wherein the soft-switching between linear equalization and decision feedback equalization employs a known symbol sequence positioned between consecutive data signal blocks in the received signal, and the soft-switching changes a reliability factor having a value ranging from 0 to 1 to control to what extent a decision feedback signal is used for equalization;
wherein the soft-switching between linear equalization and decision feedback equalization employs a second known symbol sequence, wherein filter coefficients of a second filter and filter coefficients of a third filter are set using the difference between an output of the first filter and the second known symbol sequence.

32. A computer-readable storage medium encoded thereon with instructions that when executed cause an apparatus to perform a method of processing a received signal, the method comprising:
receiving a signal;
filtering said signal with a first filter;
filtering the output of said first filter with a second filter;
adding the output of said first filter to the output of the second filter;
subtracting a decision feedback signal from the result of the adding to provide a signal for decision;
constructing an estimate of the result symbol of the subtracting such that the estimate is one of a set of predetermined symbols; and
filtering a sequence of symbol estimates to provide said decision feedback signal with a third filter having filter coefficients associated with filter coefficients of said second filter;
wherein varying the filter coefficients of the second and third filters adjusts the degree to which the decision feedback signal is relied upon for equalization;
and wherein filtering the output of said first filter with a second filter and adding the output of said first filter to the output of the second filter employs filter coefficients selected at least in part using a known symbol sequence positioned between consecutive data signal blocks in the signal;
wherein the signal comprises a second known symbol sequence and the filter coefficients of the second and third filters are set using the difference between the output of the first filter and the second known symbol sequence; and
wherein outputs of the second filter are weighted based on a scalar value ranging from 0 to 1.

* * * * *